(12) United States Patent
Bullerjahn et al.

(10) Patent No.: US 11,970,422 B2
(45) Date of Patent: Apr. 30, 2024

(54) COMPOSITE CEMENT WITH IMPROVED REACTIVITY AND METHOD FOR MANUFACTURING IT

(71) Applicant: HConnect 2 GmbH, Heidelberg (DE)

(72) Inventors: Frank Bullerjahn, Heidelberg (DE); Sigum Kjaer Bremseth, Heidelberg (DE); Kjell Skjeggerud, Heidelberg (DE); Wolfgang Dienemann, Heidelberg (DE)

(73) Assignee: HCONNECT 2 GMBH, Heidelberg (DE)

( * ) Notice: Subject to any disclaimer, the term of this patent is extended or adjusted under 35 U.S.C. 154(b) by 64 days.

(21) Appl. No.: 17/728,132

(22) Filed: Apr. 25, 2022

(65) Prior Publication Data

US 2022/0340488 A1 Oct. 27, 2022

(30) Foreign Application Priority Data

Apr. 27, 2021 (EP) .................................... 21170683

(51) Int. Cl.
| | |
|---|---|
| C04B 14/14 | (2006.01) |
| C04B 14/28 | (2006.01) |
| C04B 28/02 | (2006.01) |
| C04B 28/04 | (2006.01) |
| C04B 28/06 | (2006.01) |
| C04B 28/16 | (2006.01) |
| C04B 40/00 | (2006.01) |

(52) U.S. Cl.
CPC .............. *C04B 14/14* (2013.01); *C04B 14/28* (2013.01); *C04B 28/025* (2013.01); *C04B 28/04* (2013.01); *C04B 28/06* (2013.01); *C04B 28/065* (2013.01); *C04B 28/16* (2013.01); *C04B 40/0042* (2013.01); *Y02P 40/10* (2015.11)

(58) Field of Classification Search
CPC ....... C04B 14/14; C04B 14/28; C04B 28/025; C04B 28/04; C04B 28/06; C04B 28/065; C04B 28/16; C04B 40/0042; C04B 14/26; C04B 40/00; C04B 7/02; C04B 7/32; C04B 20/0076; C04B 20/0096; C04B 22/062; C04B 22/10; C04B 22/142; Y02P 40/10

See application file for complete search history.

(56) References Cited

U.S. PATENT DOCUMENTS

| | | | |
|---|---|---|---|
| 11,242,286 B2 | 2/2022 | Ciuperca | |
| 2010/0089293 A1* | 4/2010 | Guynn | .................... C04B 28/02 106/709 |
| 2015/0336848 A1* | 11/2015 | Gulabani | .............. C04B 24/122 106/727 |
| 2020/0262752 A1* | 8/2020 | Ciuperca | .................. C04B 7/12 |

FOREIGN PATENT DOCUMENTS

| | | | |
|---|---|---|---|
| JP | H07277785 A | * | 10/1995 |
| WO | 2018212787 A1 | | 11/2018 |

OTHER PUBLICATIONS

JPH07277785a, machine translation (Year: 1995).*
A D S Barsi, G Marchetti, M Trezza, E Irassar, Carbonate rocks as fillers in blended cements: Physical and mechanical properties, Construction and Building Materials, 248(2020), 118697. DOI:10.1016/j.conbuildmat.2020.118697. (Year: 2020).*
H. Jonsson and H. Asgeirsson "Moberg Pozzolans", Timarit VFI 1959, pp. 71-78 (in English).
G. Gudmundsen "Investigations on icelandic pozzolans", Proceedings of "Symposium on alkali aggregate reaction", Reykjavik 1975, pp. 65-75 (in English).
K. Saemundsson "Geological prospecting for pozzolanic materials in Iceland", Proceedings of "Symposium on alkali aggregate reaction", Reykjavik 1975, pp. 77-86 (in English).
Reactivity tests for supplementary cementitious materials: RILEM TC 267-TRM phase 1 / see https://link.springer.com/article/10.1617/s11527-018-1269-x (English abstract).
Extended European Search Report dated Oct. 18, 2021 issued in the corresponding EP Application Serial No. 21 17 0683 (in English).

* cited by examiner

*Primary Examiner* — Anthony J Green
*Assistant Examiner* — Marites A Guino-O Uzzle
(74) *Attorney, Agent, or Firm* — Collard & Roe, P.C.

(57) ABSTRACT

Composite cement with improved reactivity and improved fresh properties comprising a hydraulic cement or a caustic activator, a hyaloclastite as pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$), and having 0-5 wt.-% loss on ignition at 950° C. and ≥50 wt.-% X-ray amorphous phase, and a carbonate filler with an at least bimodal particle size distribution adapted to provide a slope n in a Rosin-Rammler-Sperling-Bennett distribution curve of ≤1.15 in a particle size distribution of the composite cement; a method for manufacturing it, as well as use of a composition comprising the hyaloclastite as pozzolan and the carbonate filler as mineral addition for composite cements comprising a hydraulic cement or a caustic activator.

44 Claims, 2 Drawing Sheets

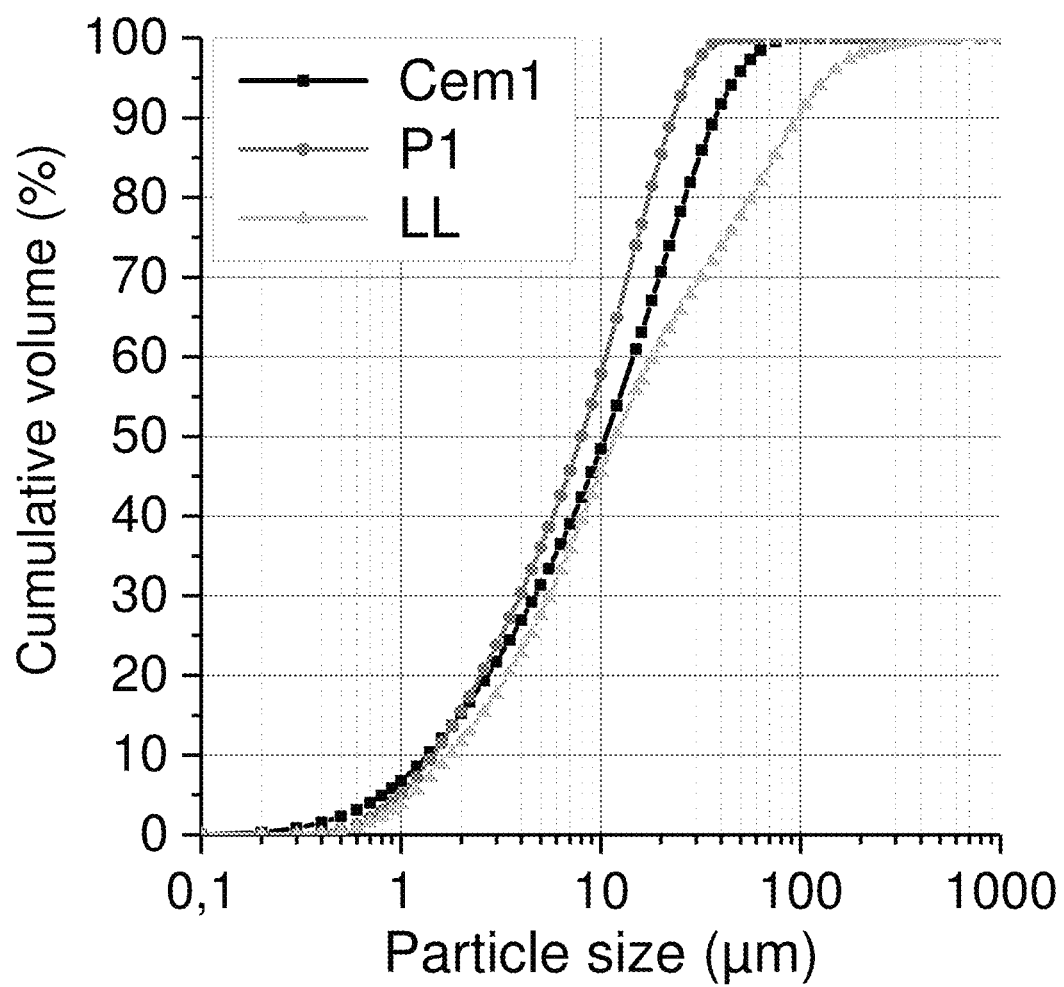
Fig. 1a: Cumulative curve

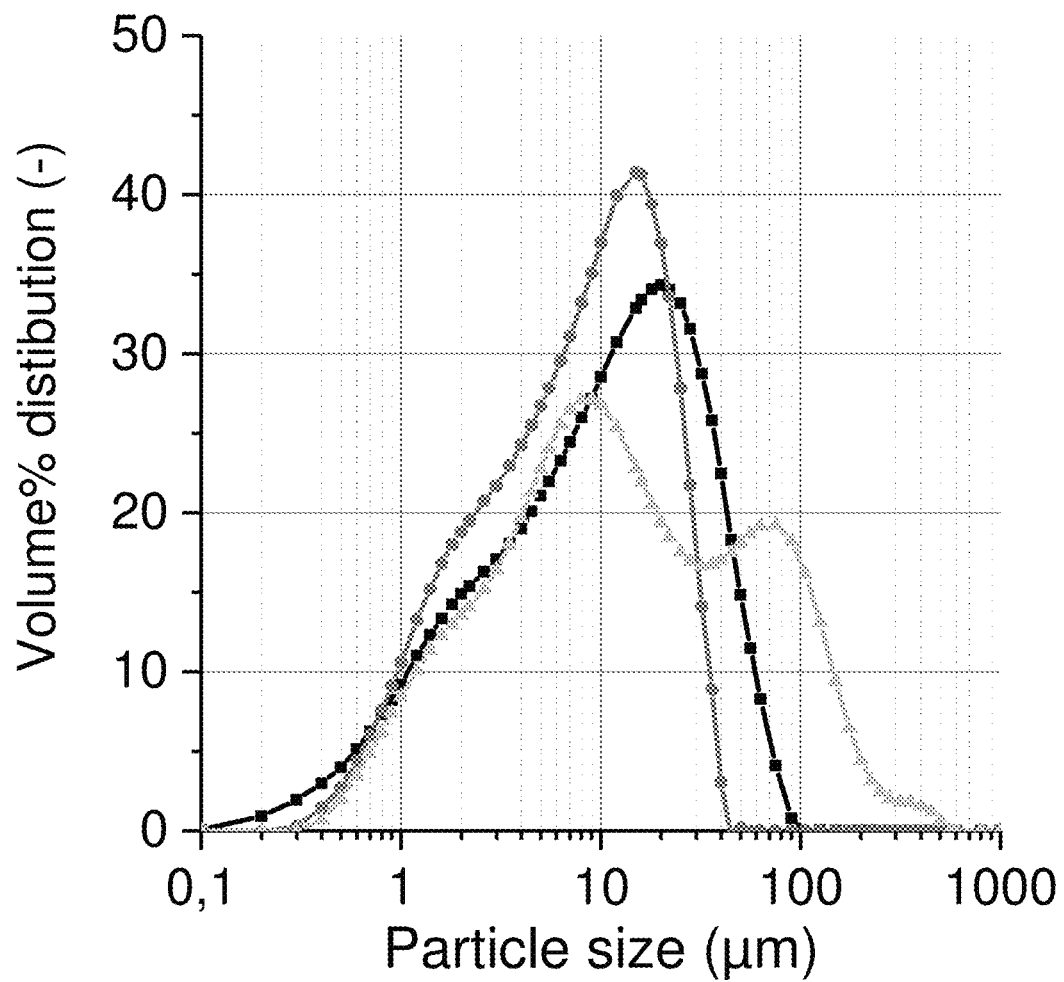
Fig. 1b: Derivative curve

COMPOSITE CEMENT WITH IMPROVED REACTIVITY AND METHOD FOR MANUFACTURING IT

CROSS-REFERENCE TO RELATED APPLICATION

This application claims priority under 35 USC 119 of European Application No. EP 21170683.3, filed on Apr. 27, 2021, the disclosure of which is herein incorporated by reference.

BACKGROUND OF THE INVENTION

The present invention relates to a composite cement with improved reactivity and to a method for manufacturing it, as well as to a use of a composition comprising a specific natural pozzolan, namely a hyaloclastite type pozzolan, and a carbonate filler as mineral addition for composite cements comprising a hydraulic cement, having an improved reactivity and improved properties of the fresh hydraulic building material.

Cement and products containing it like concrete, mortar etc. are widespread and versatile construction materials. However, the manufacturing of the most common cement, Portland cement (abbreviated PC herein), consumes considerable amounts of mineral raw materials and energy (fuel). Thus, there is a long and partly very successful history of replacing the valuable natural resources mineral raw material like limestone and fuels like coal by waste, of substituting cement clinker with supplementary cementitious material (abbreviated SCM herein) and fillers as well as finding alternative cements.

A major part of $CO_2$ emissions related to the PC clinker production originates from raw materials used, i.e. from limestone. Unfortunately, environmentally friendlier alternatives to limestone do not exist at sufficiently large scale, reduction of the raw material emissions by limestone substitution is not possible.

Reduction of cement and concrete industry environmental footprint by utilization of industrial by-products used as SCMs has reached global availability limits of these materials. Furthermore, the availability of the two most important SCMs—fly ashes and blast furnace slags—is expected to decrease with the progressing decarbonisation of the electricity sector and increased steel recycling, respectively. As a result, alternatives such as calcined clays are options for SCMs and also limestone fillers can replace clinker. Both are available in sufficient amounts to meet the increasing cement demands. However, the use of limestone is limited by its very limited reactivity. The production of calcined clay is linked to significant fuel consumption and associated $CO_2$ emissions for the calcination as well as the required drying. Clay sources typically have a high moisture content, like in the range of 20 wt.-%.

Additionally, the clinker replacement by SCMs and fillers is limited by technical requirements on the final product such as high early strength and as well by the chemical reactions taking place—without clinker, pozzolanic SCMs are inert. Thus, without further development Portland clinker will remain to be the major constituent of cements.

The $CO_2$ emissions may be limited by the further optimization of the cement clinker production. Such development is limited because of the technological barriers.

Alternative cements are difficult to establish in the highly conservative building sector and many have yet to prove they are able to fully replace PC and composite cements based on PC.

Thus, there is an ongoing need to identify further solutions.

It has long been known that volcanic glasses like hyaloclastite can be used as pozzolanic material for Portland cement, see e.g. H. Jonsson and H. Asgeirsson "Moberg Pozzolans", TIMARIT VFI 1959, pages 71-78 as well as in the proceedings of "Symposium on alkali aggregate reaction", Reykjavik 1975, G. Gudmundsen "Investigations on icelandic pozzolans", pages 65-75 and K. Saemundsson "Geological prospecting for pozzolanic materials in Iceland", pages 77-86. The interest in this material has recently been revived as shown by WO 2018/212786 A1.

However, the low early reactivity of natural pozzolans in general and of hyaloclastite in particular compared to other SCMs, such as ground granulated blast furnace slag or calcined clays, is well known. Hereby, low reactivity means that the contribution to the compressive strength development of composite cement is within similar ranges as for e.g. limestone or quartz filler. This can also be expressed as activity index as described in standards such as EN 450-1 for fly ash. Hereby, the compressive strength of a mixture is expressed as the ratio to the compressive strength of the composite cement to a neat reference cement such as CEM I 42.5 R at a substitution level of 25 wt.-% according to EN 450-1. This low reactivity limits the application of hyaloclastite in concrete due to the limited contribution to the strength development up to 28 days of hydration and respective microstructure evolution. The pozzolanic reaction typically only contributes measurably to the strength development and microstructure formation after 28 days of hydration.

Specifically, the pozzolanic reactivity of hyaloclastite is rather low at the Blaine fineness typically used for cement products such as from 3000 up to about 5000 $cm^2/g$. Satisfactory activity indexes were only reached at higher fineness above 7000 $cm^2/g$. Blaine fineness values of 3000, 5000 and 7000 $cm^2/g$ roughly translate to particle size distributions (measured by laser diffraction) with a $D_{90}$ below 90 μm, 30 μm and 20 μm, respectively. It is also important to note that basalt and other volcanic, crystalline rocks are often occurring together with hyaloclastite. Similarly, pumice, i.e. another volcanic, amorphous, i.e. glassy, material, also can occur together with hyaloclastite. The grindability of hyaloclastite is rather low and the presence of basalt and other crystalline rocks even further decreases it. At the same time the abrasiveness is rather high, especially with increasing crystalline rock contents. Consequently, measures to increase the reactivity, especially the contribution to the strength development up to at 28 days, without the need for a very high Blaine fineness, would be beneficial for the use of such pozzolan type as SCM in composite cement.

Surprisingly it was now found that a composite cement comprising hyaloclastite as pozzolan in combination with carbonate filler having a specific particle size distribution (abbreviated PSD herein) such as limestone exceeds the performance of the neat pozzolan-based cement as well as of a limestone reference cement measurably at all hydration ages.

SUMMARY OF THE INVENTION

Thus, the present invention solves the above problem by a composite cement comprising:

a hydraulic cement or a caustic activator, a hyaloclastite as pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$), and having 0-5 wt.-% loss on ignition at 950° C., whereby the sum of all elements, including ones not listed, is 100 wt.-% within measurement accuracy, and having ≥50 wt.-% X-ray amorphous phase, and a carbonate filler having an at least bimodal particle size distribution adapted to provide a broad particle size distribution of the composite cement with a slope n of a Rosin-Rammler-Sperling-Bennett distribution curve ≤1.15.

The problem is further solved by a method of manufacturing a composite cement comprising the steps:

providing a hydraulic cement or a caustic activator, providing a hyaloclastite as pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$), and having 0-5 wt.-% loss on ignition at 950° C., whereby the sum of all elements, including ones not listed, is 100 wt.-% within measurement accuracy, and having 50 wt.-% X-ray amorphous phase, providing a carbonate filler with an at least bimodal particle size distribution adapted to provide a broad particle size distribution of the composite cement with a slope n of a Rosin-Rammler-Sperling-Bennett distribution curve ≤1.15, ground partly (≥20 wt.-%, preferably ≥50 wt.-%, and most preferred ≥80 wt.-%) or fully separately from the hydraulic cement and pozzolan, and blending the hydraulic cement or the caustic activator, the pozzolan and the carbonate filler to provide the composite cement.

DETAILED DESCRIPTION OF THE INVENTION

Herein, the hyaloclastite is typically ground in a way, preferably separately from the hydraulic cement clinker and carbonate filler, to reach a steep, monomodal particle size distribution measured by laser diffraction, i.e. a narrow slope n of the cumulative volume PSD of the Rosin-Rammler-Sperling-Bennett (abbreviated RRSB herein) distribution curve. The n value (also referred to as the width or size distribution of the PSD ranging from narrow/close to broad/wide) should be in the range from 0.9 to 1.4, preferably in the range from 1.0 to 1.2 and most preferred around 1.1. The respective $D_{90}$ value (i.e. 90% of the particles passing, determined by laser diffraction as all particle sizes below 1 mm unless mentioned otherwise) should be, but not limited to, ≤30 μm, preferably ≤20 μm, and most preferred 15 μm.

In contrast, the carbonate filler should have a broad and at least bimodal PSD to provide a broad PSD together with the hydraulic cement/caustic activator and the pozzolan in the final composite cement. A part or all carbonate filler is preferably produced by separate grinding. At least 20 wt.-% of a fine fraction with a $D_{90}$≤30 μm, or ≤20 μm or ≤10 μm should be present. Additionally, ≥20 wt.-% of the carbonate filler in the composite cement should be present in a coarse size fraction with a $D_{10}$≥30 μm or ≥35 μm or ≥40 μm. The respective $D_{90}$ of the coarse fraction should be ≤150 μm or ≤120 μm or ≤90 μm. The respective n value of the PSD of the carbonate filler in the composite cement should be below 1.0, preferably below 0.85 and most preferred below 0.75. Suitable bimodal PSD can have a first maximum in the range from 40 to 80 μm and a second one below 20 μm, preferably in the range from 1 to 10 μm, for usual PSD of the hydraulic cement/caustic activator and the pozzolan. Of course, in cases where the pozzolan and/or the hydraulic cement/caustic activator or even further components of the composite cement occupy the very fine particle size range with $D_{90}$ below 10 μm, the fine fraction of the carbonate filler should be coarser, e.g. having a maximum from 10 to 20 μm.

Additionally, it was found that the pozzolanic activity is further improved in alkali-rich cements and/or cements low in $C_3A$. Thus, the reactivity of the novel composite cements according to the invention can be improved by using a hydraulic cement with at least 0.3 wt.-% $Na_2O$ Eq. and/or by adjusting the alkali content in the hydraulic cement or composite cement by an addition of alkali-bearing materials, such as but not limited to by-pass dust and cement kiln dust. Further, the use of cements with $C_3A$ contents below 18 wt.-% with respect to the cement helps to improve the activation the hyaloclastite pozzolan. Also, increasing the hydraulic cement fineness and the use of certain grinding aids and plasticizers helps to activate the hyaloclastite. The hydraulic cement is preferably chosen from Portland cement and cement types comprising PC.

The use of carbonate filler with at least a bimodal particle size distribution is advantageously able to compensate the negative impact of the use of high quantities of finely ground pozzolan with a narrow particle size distribution on the fresh (e.g. water demand, workability, segregation and bleeding) and hardened (e.g. porosity, water update, strength) cement properties in mortar and concrete. The use of such carbonate filler enables the production of a uniformly graded composite cement. The n value of the cumulative PSD of the composite cement is typically ≤1.15, preferably it should be in the range from 0.80 to 1.15, more preferred from 0.90 to 1.05, and most preferred between 0.95 to 1.00. The respective $D_{90}$ value should be, but not limited to, ≤100 μm, preferably ≤60 μm, and most preferred ≤50 μm. Moreover, the tailored production of a small fraction of fine carbonate filler provides synergies by maximising the use of its limited reactivity in Portland cement-based hydraulic binders, promoting the formation of mono- and hemicarboaluminate over monosulfate and by that stabilising ettringite. This is beneficial for the use of the alumina-rich hyaloclastite type pozzolan. Again, the use of cement with low $C_3A$ content and/or high $Na_2O$ Eq. in presence of limestone can further improve the activation of the pozzolan in the composite cement, associated with the glass dissolution and linked ettringite, mono- and hemicarboaluminate formation.

Adding alkali, e.g. in the form of carbonates, sulfates, chlorides, or process dust from clinker production such as cement kiln dust (abbreviated CKD herein) and by-pass dust (abbreviated BPD herein) which can contain soluble (calcium) alkali sulfates, free lime, periclase and others, is advantageously able to accelerate the cement hydration and to accelerate the pozzolanic reaction of the hyaloclastite pozzolanic material.

The novel composite cement shows synergies between the graded carbonate filler and the pozzolan, i.e. an early (up to 28 days, preferably up to 7 days) activation of the pozzolanic reaction, that was not known or expected for a pozzolan of the hyaloclastite type. Thus, the novel cement and method allow a use of specific natural pozzolans in higher amounts without loss of mechanical strength, thereby reducing $CO_2$ footprint and saving natural resources. Additionally, it reduces the fineness level needed to reach a satisfactory reactivity.

So as to simplify the description the following abbreviations that are usual in the field of cement are used herein:

H—$H_2O$, C—CaO, A—$Al_2O_3$, F—$Fe_2O_3$, K—$K_2O$, M—MgO, N—$Na_2O$, S—$SiO_2$ and \$—$SO_3$. Compounds are mostly named by the pure form, without explicit mentioning of solid solutions, foreign ion substitution and impurities etc. as are usual in technical and industrial materials. As the man skilled in the art knows, the exact composition of the phases described may vary due to substitution with foreign ions. Such compounds are comprised when mentioning the pure form herein unless it is expressly stated otherwise.

The term "reactive" shall mean a hydraulic reactivity unless specified otherwise. Hydraulic reactivity designates the reaction of a compound with water or other water containing compounds to form hydrated phases including a reaction of two or more compounds occurring simultaneously.

Herein, clinker designates a sinter product obtained by burning a raw material at elevated temperature and containing at least one hydraulic phase. Burning means a change of one or more property of the starting material such as chemistry, crystallinity, phase composition, spatial arrangement and bonds of lattice atoms which is brought about by a supply of thermal energy. The starting material may be a single material, but usually it is a mixture. The starting material is typically finely ground and then designated as raw meal. The starting material may contain mineralizers, which are substances decreasing the temperature necessary for melting and/or act as fluxes and/or enhance clinker formation e.g. by forming solid solutions or stabilisation of phases. Mineralizers can be part of the starting material components or be added as separate component.

Cement is used to designate a material that, after mixing with water to form a paste, can develop mechanical strength by hydraulic reaction. Thus, cement denotes a clinker ground with or without further components, and other mixtures like super sulphated cement, geopolymer binder, and dicalcium silicate cement obtained by hydrothermal treatment. A cement is used adding water or another liquid and mostly also aggregate as well as optionally admixtures and/or additives.

A supplementary cementitious material is defined as a pozzolanic and/or latent hydraulic material useful to replace a part of the clinker in a binder. Latent hydraulic materials have a composition that allows hydraulic reaction upon contact with water, wherein typically an activator is needed to enable hardening within technically feasible times. Activator means a substance that accelerates the hardening of latent hydraulic materials. It can be an addition like sulfate or calcium (hydr)oxide and/or products of the hydraulic reaction of the ground clinker, e.g. calcium silicates liberate calcium hydroxide during hardening. Pozzolanic materials are characterized by a content of reactive silica and/or alumina which form strength providing calcium silicate hydrates and calcium aluminate (ferrite) hydrates, respectively, from the reaction with calcium hydroxides e.g. liberated during hydration of the clinker mineral phases such as alite ($Ca_3SiO_5$) and belite ($Ca_2SiO_4$). In practice the limit between latent hydraulic and pozzolanic materials is not well defined, for example fly ashes can be both latent hydraulic and pozzolanic depending on their calcium oxide content. Consequently, the term SCM designates both latent hydraulic as well as pozzolanic materials. However, not reactive or only slightly reactive materials like limestone and other carbonate rocks, such as but not limited to dolomite, magnesite and mixes thereof, that substantially do not take part in the hydraulic reaction have to be clearly differentiated from SCM, with which they are summarized as mineral additions herein.

The term composite cement designates cements that comprise a hydraulic cement as well as one or more SCM and/or carbonate filler The term further covers binders made from SCM and a caustic activator, such as but not limited to, free lime, portlandite, PC and sulfates, e.g. alkali activated binders (also designated geopolymer binders), slaked lime activated binders and periclase activated binders (also designated Roman cement), and super sulfated cements, which contain a carbonate filler.

According to the invention composite cements with improved reactivity are provided by combining a hyaloclastite-type of natural pozzolan with a carbonate filler for blending with the hydraulic cement or the caustic activator.

The natural pozzolan used to make the composite cement according to the invention is hyaloclastite, i.e. a special volcanic glass containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$) as measured by X-fluorescence analysis, and having 0-5 wt.-% loss on ignition at 950° C. (abbreviated loi herein), and ≥50 wt.-% X-ray amorphous phase as measured by X-ray diffraction combined with Rietveld analysis. The sum of all elements, including ones not listed, and loi is 100 wt.-% within measurement accuracy. Other elements are usually present in an amount from 0.5 to 4 wt.-%. Typical other elements are Ti, Mn, phosphor and sulfur. In particular, the high calcium and magnesium oxide content together with the relatively low silica content is rather unique, compared to other well-known natural pozzolans that were reportedly used as SCM such as pumice, perlite, or obsidian.

Volcanic glasses are natural pozzolans formed when magma or lava is cooled rapidly. The chemical composition and resulting mineralogy of the igneous rock formed is varied. The present invention uses specific glassy rocks formed by quench fragmentation of lava flow surfaces under water or ice, mostly during submarine or subglacial extrusion, which have high calcium and magnesium oxide content but rather low silica contents and are usually designated hyaloclastite. However, hyaloclastite is a generic name for such glasses that does not differentiate between the original mineral rocks formed, typically sideromelane and/or tachylite, and the increasing amount of palagonite forming by reaction of them with water and even further alteration products such as clay and mica minerals. Hyaloclastite as used herein does not exclude the presence of other rocks and minerals, such as but not limited to basalt, and degradation products of sideromelane/tachylite, such as but not limited to palagonite, and degradation products of the other minerals, such as but not limited to clay, mica, carbonates and hydroxides. As a rule, the sum of other (volcanic) rock-forming mineral phases and degradation products should be ≤50 wt.-%, preferably ≤40 wt.-% and most preferred ≤30 wt.-% in hyaloclastite pozzolans used according to the invention. Bigger amounts of degradation products, especially of palagonite, are not desirable. Palagonite presents a naturally altered, i.e. reacted material. Thus, the pozzolanic reactivity of the original volcanic glass is lost or at least reduced. At the same time reaction products were formed. Those will strongly increase the specific surface area of the material and hence, will affect the fresh properties in e.g. concrete such as water demand or spread. This also applies to the products of a further progressing degradation. In contrast, the fresh volcanic glass, i.e. hyaloclastite, used according to the invention demonstrates excellent properties such as reduced water demand. Additionally, during the natural weathering of hyaloclastite iron hydroxides form, resulting in the brownish, yellowish and reddish color of palagonite. Customers expect greyish cement and concrete, hence such esthetic impact is a substantial disadvantage.

The hyaloclastite used comprises ≥50 wt.-% of an X-ray amorphous, i.e. glassy, phase, preferably ≥60 wt.-%, more preferred ≥70 wt.-%, most preferred ≥80 or 85 wt.-%. The volcanic glass has a chemical composition in the range of sideromelane and/or tachylite with regard to the content of CaO and MgO over $SiO_2$. The amount of crystalline phases, i.e. either from the glass devitrification such as palagonite or from intermixing with other (volcanic) rock-forming mineral phases such as from basalt, should be ≤50 wt.-%, preferably ≤40 wt.-% and most preferred ≤30 wt.-%. The typical chemical composition of hyaloclastite is shown in table 1 below.

TABLE 1

| Oxide | typical amount [wt.-%] | preferred amount [wt.-%] |
|---|---|---|
| $SiO_2$ | 45-62 | 46-54 |
| $Al_2O_3$ | 10-20 | 12-17 |
| $TiO_2$ | 0.5-2 | 0.5-2 |
| $Fe_2O_3$ | 6-15 | 8-14 |
| CaO | 7-15 | 10-13 |
| MgO | 7-15 | 10-13 |
| $K_2O$ | 1.5-4 | ≤3 |
| $Na_2O$ | | |

A high X-ray amorphous content is beneficial for the grindability because of the lower content of even harder and more abrasive materials such as basalt and other crystalline components. Additionally, higher X-ray amorphous contents are targeted to achieve a high pozzolanic reactivity. In one embodiment, the hyaloclastite pozzolan is treated in a way to reduce the content of crystalline rock, such as but not limited to basalt, e.g. by sieving to increase the X-ray amorphous content. For that, the mined pozzolan, either ground or crushed, with or without prior drying, is sieved (wet, semi-wet or dry) to obtain a size fraction from 0-10 mm, preferably from 0-6 mm and most preferred from 0-4 mm (nomenclature for obtained size fraction as e.g. referred to in DIN EN 12620, determined by sieving). A drying of the pozzolan prior to the sieving is preferred. Of course, also intermediate size fractions, such as 2-4 mm, can enrich the amorphous content enough. Finer ones, such as 0-1 mm, are also possible, but more challenging to be industrially realized. It is also possible to enrich the amorphous content by flotation and recovering of the fine material. However, this is not economically preferable due to the need of energy intensive drying that would be required afterwards. The sieving enables to not only produce hyaloclastite pozzolan with ≥50 wt.-% X-ray amorphous phase but also to increase the content to values ≥80 wt.-% and even ≥85 wt.-%. Additionally, the grindability of the pozzolan will improve by the extraction of hard and abrasive crystalline rocks such as basalt.

The pozzolan according to the invention is typically used with a fineness according to Blaine from 4500 to 8000 $cm^2/g$, preferably from 5000 to 6000 $cm^2/g$. A steep, monomodal PSD as measured by laser diffraction (also referred to as laser granulometry), i.e. a narrow slope n of the cumulative volume PSD of the RRSB distribution curve, is usually targeted. Steep or narrow slope n means with an n value in the range from 0.9 to 1.4, preferably in the range from 1.0 to 1.2 and most preferred around 1.1. The $D_{90}$ value (i.e. 90% of the particles passing, determined by laser diffraction) should be ≤30 μm, preferably ≤20 μm, and most preferred ≤15 μm. The pozzolan is preferably ground separately from the hydraulic cement and carbonate filler.

The hydraulic cement is preferably a Portland cement or a PC-based cement, however, other hydraulic cements such as, but not limited to, calcium aluminate cements, calcium sulfoaluminate cements, belite binders obtained by hydrothermal treatment and subsequent tempering and/or reactive grinding are also useful. Alternatively, a caustic activator, such as but not limited to free lime, portlandite, PC clinker, PC, alkali hydroxides, alkali carbonates and alkali sulfates, is used instead of the hydraulic cement to form a composite cement being an alkali activated binder (also referred to as geopolymer binder), a slaked lime or periclase activated binder (also referred to as Roman cement), or a super sulfated cement. More than one caustic activator can be used. Additionally, mixtures of two or more hydraulic cements as well as of hydraulic cement and caustic activator are possible to be used to form hybrid binders, such as but not limited to mixtures of Portland cement and alkali activated binders or Portland cement and slaked lime or periclase activated binders. The difference between PC as hydraulic cement and its use as caustic activator is the amount used, a cement is usually comprised in amounts of at least 20 wt.-%, typically at least 35 wt.-%, whereas a caustic activator is typically used in amounts of a few percent, e.g. from 1 to 15 wt.-%, often from 5 to 10 wt.-%.

In one preferred embodiment the hydraulic cement is or contains a Portland cement with an $Na_2O$ Eq. ($Na_2O$ Eq.=wt.-% $Na_2O$+0.658 wt.-% $K_2O$, both wt.-% with respect to the PC clinker) from 0.3 to 2.5 wt.-%, preferably from 1.0 to 2.0 wt.-%, most preferred from 1.2 to 1.5 wt.-%. Advantageously, in the hydraulic cement the amount of $C_3S$ ranges from 45 to 75 wt.-% with respect to the PC clinker, preferably from 55 to 65 wt.-%. Preferably, the amount of $C_3A$ ranges from 1 to 18 wt.-% with respect to the PC clinker, preferably from 2 to 12 wt.-%, and most preferred from 3 to 7 wt.-%. It is of course possible to use a $C_3A$-free cement to maximise the activation of the pozzolan. However, the early strength development of such cements such as during the first 24 hours is typically reduced, linked to the lack of ettringite formation from the $C_3A$ hydration. Also, the availability of such cements is rather limited.

In one embodiment the $Na_2O$ Eq. of the hydraulic cement is adjusted by adding one or more alkalis, i.e. alkali source(s), preferably BPD and/or CKD. BPD and CKD are fine powders which can contain various reactive components such as calcium and magnesium oxide, calcium sulfates, alkali sulfates, intermediate clinker phases and others. Generally speaking, CKD consists of four major component categories: unreacted raw feed, partially calcined feed and clinker dust, free lime, and enriched salts of alkali sulfates. BPD contains similar components as CKD but typically has higher contents of alkali sulfates and additionally high concentrations of salts of alkali halides, and other volatile compounds. The composition of BPD and CKD varies from plant to plant depending on the cement plant design (e.g. the location within the dust collection or by-pass system, the type of operation, the dust collection facility, exhaust gas composition, temperature, etc.) the raw mix and fuel mix design.

The hydraulic cement can have a usual fineness, e.g. from 2000 to 10000 $cm^2/g$ Blaine fineness, preferably from 3000 to 8000 $cm^2/g$. In one embodiment a fine, hydraulic cement is used, i.e. the Blaine fineness is at least 4000 $cm^2/g$, preferably at least 5000 $cm^2/g$. The caustic activator is usually provided with the same fineness. Typical median particle sizes of hydraulic cements range from 20 μm to 10

μm with typical $D_{90}$ values of ≤40 μm or ≤30 μm. The PSD of the hydraulic cement/caustic activator can be wide or narrow, since the other two components allow to adapt the desired width PSD of the composite cement.

The carbonate filler is preferably selected from limestone, dolomite and magnesite, most preferably is limestone. Other carbonates, especially earth alkali metal carbonates, can also be used. However, alkali carbonates, especially sodium and potassium carbonate, are no carbonate fillers with respect to the present invention because they have a too high solubility in water. Further, synthetic carbonates like precipitated nanosized carbonates (i.e. with particle sizes below 1 μm), poorly crystalline (also referred to as microcrystalline) or X-ray amorphous carbonates as well as complex partly hydrated carbonates, such as but not limited to monohydrocalcite, hydromagnesite, nesquehonite, and dypingite, and mixtures of two or more thereof can be used. The synthetic carbonates are especially useful if added to adjust the content of the fine fraction of the carbonate filler in the composite cement, e.g. carbonate filler in the size fraction with a $D_{90}$ of ≤30 μm or ≤20 μm or ≤10 μm. Carbonate filler with at least a bimodal particle size distribution is used, preferably a broad, bimodal PSD is targeted, to produce a uniformly graded composite cement. It has been found that it is important to use a carbonate filler that was at least partly ground separately from the hydraulic cement and the pozzolan to obtain a suitable, at least bimodal PSD. It is possible to grind a—preferably minor—portion of the carbonate rock or other carbonate raw material together with the hydraulic cement, the pozzolan or a hydraulic cement-pozzolan mix to a—preferably high—fineness, whereas the rest is ground separately to a—preferably low—fineness. With that, a broad bimodal distribution can be established while the—preferably small—fraction of fine carbonate filler provides synergies by maximising the utilization of its limited reactivity in Portland cement-based hydraulic binders or other hydraulic binders, promoting the formation of mono- and hemicarboaluminate. This is also beneficial for the use of the alumina-rich hyaloclastite type pozzolan. The coarse fraction enables the production of a uniformly graded composite cement.

The carbonate filler has an at least bimodal particle size distribution. Preferably it has a bimodal particle size distribution. Preferably it has a main fraction on the coarse side, which herein refers to the fraction with a $D_{10}$≥30 μm or ≥35 μm or ≥40 μm, to optimize the volume filling and particle size distribution of the composite cement. The coarse fraction should preferably provide particles with a $D_{90}$ value (i.e. 90% of the particles passing, determined by laser diffraction) ≤150 μm or ≤120 μm or ≤90 μm. Usually ≥20 wt.-%, preferably ≥30 wt.-%, most preferred ≥40 wt.-%, of the carbonate filler in the composite cement should be present in the coarse size fraction. The carbonate filler comprises fine particles, whereby ≥20 wt.-%, preferably ≥30 wt.-%, of the carbonate filler should be present in the fine size fraction with a $D_{90}$≤30 μm or ≤20 μm or ≤10 μm.

In the composite cement the amount of pozzolan and carbonate filler together usually ranges from 15-50 wt.-%, preferably from 20 to 35 wt.-%, and most preferred from 22 to 30 wt.-% with respect to the total composition. The weight ratio of pozzolan to carbonate filler ranges typically from 20:1 to 1:1, preferably from 15:1 to 2:1, and most preferred from 9:1 to 4:1.

The composite cement can contain further SCMs such as, but not limited to, ground granulated blast furnace slag, fly ash, calcined clay or shales, trass, brick-dust, artificial glasses, waste glass, silica fume, burned organic matter residues rich in silica such as rice husk ash, carbonated recycled concrete fines, natural pozzolans other than hyaloclastite, and mixtures of two or more thereof.

Additionally, admixtures, such as but not limited to plasticizers, superplasticizers, water reducers, stabilizers, air entraining agents, setting accelerators, hardening accelerators, retarders, sealants, chromate reducing agents and/or grinding aids, can be contained.

In one preferred embodiment at least one of the composite cement components is ground in the presence of a grinding aid. Useful grinding aids are for example, but not limited to, alkanolamines; sugars and sugar derivatives; glycols like e.g. monoethylene glycols, diethylene glycols or triethylene glycols; carboxylic acids and their salts like e.g. oleic acid, ethylenediaminetetraacetic acid (EDTA), sodium gluconate; carbonic anhydrase; diols; glycerol; sulphonic acids; (ligno) sulphonates; and mixtures thereof. Additionally, copolymers prepared by combining two or more of those compounds can be used. Preferably an alkanolamine is used, especially one selected from monoethanolamine (MEA), diethanolamine (DEA), diglycolamine (DGA), diisopropanolamine (DIPA), triethanolamine (TEA), triisopropanolamine (TIPA), and mixtures thereof. Typical dosages range from 0.01% to 1.0% by weight, preferably 0.02% to 0.5% by weight, and most preferred from 0.05 to 0.15% by weight relative to the weight of solid material. The grinding aid can be added to any of the dry materials, to the concrete mixer (separately or with the mixing water) but should be preferably added during the hydraulic cement and/or the pozzolan grinding.

Preferably, a chromate reducing agent is added to the composite cement or hydraulic cement. The chromate reducing agent can be added before, during or after the hydraulic cement grinding or during blending of the components to provide the composite cement. Alternatively, the agent can be added during the concrete mixing. The chromate reducing agent can be chosen for example, but not exclusively, from the group of ferrous sulphates, stannous sulphates, stannous chlorides, stannous oxides, sodium sulphates, salts of manganese and/or cobalt in the divalent and/or trivalent oxidation state and mixtures thereof.

According to the invention the composite cement is made by blending or (selective) co-grinding of hydraulic cement, pozzolan and carbonate filler. It is also possible to replace the hydraulic cement partly or fully by one or more caustic activators such as free lime, portlandite, PC, PC clinker, alkali hydroxides, alkali carbonates and/or alkali sulfates to provide a super sulfated cement, geopolymer binder or Roman cement as the composite cement.

In the method according to the invention, the hydraulic cement is provided in one step, typically by grinding a cement clinker, preferably a Portland cement clinker. As mentioned before, a grinding aid may be used. Further, additional components can be ground together with the clinker, e.g. the pozzolan, further SCM if applicable, a part of the carbonate filler, and/or a sulfate carrier. It is also possible to add additives and/or admixtures already during grinding of the cement. Such further components may also be admixed to the ground cement. Alternatively, the caustic activator is provided, possibly also already mixed with one or more of further SCMs, (part of) carbonate filler, additives, and admixtures.

In another step, the hyaloclastite as pozzolan is provided. Typically, the mined and crushed pozzolan is ground separately, also with a grinding aid if desired. It can also be co-ground with the clinker. Several batches of pozzolan can be mixed to produce a homogenized pozzolan quality with the desired chemical and mineralogical composition. The pozzolan can be treated to increase its X-ray amorphous content, e.g. by sieving. It is also possible to premix the pozzolan with further desired components of the composite cement like the carbonate filler, one or more further SCMs if applicable, additives and/or admixtures.

In still another step the carbonate filler is provided. Usually, the mined rock is crushed and ground to the desired fineness and particle size distribution. Additionally or alternatively, synthetic carbonates are provided, and if needed also ground. The carbonate is ground fully or partly separately from the cement and the pozzolan. Preferably the majority, e.g. ≥80 wt.-%, of the carbonate (rock) is ground separately from the cement, preferably from all other components. A minor fraction, ≤20 wt.-%, preferably ≤10 wt.-% and most preferred ≤5 wt.-%, can be ground together with the cement clinker, the pozzolan, mixes thereof, and with one or more other SCM types when such are added. At least 5 wt.-% of the total carbonate filler, including the separate ground coarse type, should be present in a fine size fraction with $D_{90}$≤30 μm or ≤20 μm or ≤10 μm in the composite cement. Especially the fine fraction can also be provided from precipitated nanosized carbonates, poorly crystalline or X-ray amorphous carbonates as well as complex partly hydrated carbonates. The carbonate (rock) can also be ground in the presence of a grinding aid. The portion of carbonate filler obtained by separate grinding can be premixed with the hydraulic cement or caustic activator, the pozzolan and/or with further desired components of the composite cement like one or more further SCM if applicable, additives and/or admixtures. The final broad (at least) bimodal PSD of the carbonate filler in the composite cement should preferably have at least one maximum in the range ≤20 μm or ≤10 μm, and at least one other maximum in the range ≥40 μm. Preferably, ≥20 wt.-%, more preferred ≥30 wt.-% of the carbonate filler in the composite cement should have a $D_{90}$≤30 μm or ≤20 μm or ≤10 μm, and/or ≥20 wt.-%, preferably ≥30 wt.-%, most preferred ≥40 wt.-%, should have a $D_{10}$≥30 μm or ≥35 μm or ≥40 μm.

Typical grinding systems such as ball mills, vertical roller press mills and others, but also special mill systems such as jet mills and others, can be used to grind the pozzolan, the hydraulic cement, and the carbonate filler to the targeted fineness. Vertical roller press mills, jet mills and other systems enabling the production of monomodal distributions with steep cumulative curves are preferred for the pozzolan. Those are also useful for the carbonate filler, when it is provided as mixture of two fractions with narrow PSD having appropriately distanced $D_{50}$ values. Especially, the coarse fraction can be obtained by grinding carbonate rock with such a mill and the fine is provided in the form of a precipitated carbonate.

The last step is blending all components to provide the composite cement according to the invention. Blending can occur for all components at the same time, or two components—or more if optional ones are used—are premixed before the final blending step. The so produced composite cement should have a usual fineness, e.g. from 3500 to 10000 cm²/g Blaine fineness, preferably from 4500 to 8000 cm²/g and most preferred from 5000 to 6000 cm²/g.

Thus, the method according to the invention can use the known and available devices and each step as such takes place in a manner known per se. No special equipment or training of operators is needed.

The composite cement according to the invention shows the same or even improved fresh properties such as water demand, mortar spread and setting times as the neat cement or known composite cements with the classic SCM such as ground granulated blast furnace slag and fly ash but also compared to pozzolan cement with only the pozzolan. At the same time, the compressive strength development is improved up to at least 28 days of hydration compared to the cement containing only the pozzolan. Contrary to fly ashes, the hyaloclastite pozzolan does not contain easy soluble components such as sodium or potassium sulfates, calciolangbeinite, apthialite and others. Additionally, neither free calcium oxide, free magnesium oxide nor carbon are present. Easy soluble sulfate-bearing phases can affect the fresh concrete properties if they are present, resulting for example in reduced setting times or lowering the efficacy of added water reducing agents and others. The reactivity of free CaO (also referred to as lime or free lime) and MgO (periclase) depends on the calcination/sintering temperature. Those phases dissolve rapidly when prepared at low temperatures (for CaO typically below 1100° C. to 1200° C. and for MgO below 900° C.), resulting in a possible increase of the water demand, lower spread and shortened setting times of concrete. Contrary, those phases can be almost inert when sintered at higher temperatures, resulting in a late hydration and unwanted expansion in concrete, associated with the risk of expansion and cracking. Also the presence of unburnt carbon in fly ashes is critical as the carbon can interact with chemical admixtures such as plasticisers, reducing the effectiveness.

The composite cement according to the invention is useful for all applications where known composite cements and PC are currently used. Thus, the composite cement can be used to make building materials such as but not limited to concrete, mortar, and construction chemical compositions like, but not exclusively, tile adhesive, floor screed, and plaster. The building materials contain the usual and known further components in the usual amounts. For example, to make concrete the composite cement is mixed with water and aggregate, typically also admixtures are added and often additives. The building materials then provide building elements like walls, pillars, floors, ceilings, foundations etc. from on-site or ready mix concrete; or pre-cast building elements like walls, pillars, floors, ceilings, panels, pipes, pavers etc.; or tiled walls/floors; or floors, or plastered walls.

The invention further solves the problems mentioned before by providing a composition comprising:
  a hyaloclastite as natural pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O$+ $Na_2O$), and having 0-5 wt.-% loss on ignition at 950° C. as well as ≥50 wt.-% X-ray amorphous phase, and
  a carbonate filler with an at least bimodal particle size distribution for use as mineral addition for composite cements with good reactivity. The previously mentioned amount of mineral addition is useful. The weight ratio of pozzolan to filler is preferably as mentioned above. The PSD of the carbonate filler is adapted to the particle sizes of the other components of the composite cement as described before, so that the composite cement has an RRSB slope n≤1,15.

The combined use of pozzolan and carbonate filler described above as components of the composite cement according to the invention and the method for manufacturing it provides composite cements with good reactivity. Herein, good reactivity means the contribution to the compressive strength development compared to that of a composite cement made with the same amount of PC but with only pozzolan added. This can also be expressed as activity index as described in standards such as EN 450-1 and EN 15167-1. Hereby, the compressive strength of a mixture is expressed as the ratio to the compressive strength of the composite cement to a neat reference cement such as CEM I 42.5 R. The substitution levels are 25 wt.-% and 50 wt.-% according to EN 450-1 and EN 15167-1, respectively. Additionally, the hyaloclastite pozzolan should reach a minimum R3 cumulative heat of hydration (from isothermal conduction calorimetry, see EN 196-11:2018) and R3 bound water content (methods described in the document "Reactivity tests for supplementary cementitious materials: RILEM TC 267-TRM phase 1"; see https://link.springer.com/article/10.1617/s11527-018-1269-x). Hereby, the cumulative heat of hydration after 7 days should reach 180 to 320 J/g, preferably 200 to 300 J/g, and most preferred 220 to 280 J/g. The bound water content after 7 days should reach from 4.5 to 7.5 wt.-%, preferably from 5.0 to 7.0 wt.-%, and most preferred from 5.3 to 6.5 wt.-%.

Preferably, also the water demand and workability, e.g. determined as spread of a fresh mortar and/or its setting times, equals that of a composite cement made with the same amount of only pozzolan and PC.

The invention will be illustrated further with reference to the examples that follow, without restricting the scope to the specific embodiments described. The invention includes all combinations of described and especially of preferred features that do not exclude each other. Features described for the composite cement are applicable to the method for manufacturing it and vice versa, the same applies with respect to the use of the composition comprising hyaloclastite as pozzolan and carbonate filler as mineral addition.

If not otherwise specified any amount in % or parts is by weight and in the case of doubt referring to the total weight of the composition/mixture concerned. A characterization as "about", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

BRIEF DESCRIPTION OF THE DRAWING FIGURES

FIGS. 1a and 1b show the particle size distribution of three components of a composite cement according to the invention.

DETAILED DESCRIPTION OF THE EMBODIMENTS

Examples

The following materials were used:
a first cement CEM I 142.5 R "Cem1"
a second cement CEM I 42.5 R "Cem2"
a third low-alkali cement CEM I 42.5 R NA "Cem3"
a fourth cement CEM I 42.5 R "Cem4"
a fifth low-alkali cement CEM I 42.5 R NA "Cem5"
a sixth cement CEM I 52.5 N "Cem6"
a seventh limestone cement CEM II/A 42.5 N with about 11 wt. % of limestone (co-ground) "Cem7"
four different ground hyaloclastite pozzolans "P1", "P2", "P3", "P4", and
a ground limestone "LL".

Separately ground pozzolan and limestone were used if not mentioned otherwise. The chemical composition, including the loss on ignition, X-ray amorphous content of the pozzolan, and $Na_2O$ Eq. in wt.-%, the $C_3A$ content in wt.-%, and the Blaine fineness in $cm^2/g$ of the used materials is compiled in table 2 below. The sulfate content of the cements was adjusted using calcium sulfate (namely gypsum, basanite and anhydrite). Additionally, calcium alkali and alkali sulfates from the clinker, CKD and BPD were present. High $SO_3$ contents were chosen to bind most up to all liberated aluminium ions from the $C_3A$ dissolution into hydrates such as ettringite, and with that, enable an enhanced activation of the pozzolan.

TABLE 2

|  | Cem1 | Cem2 | Cem3 | Cem4 | Cem5 | Cem6 | Cem7 | P1 | P2 | P3 | P4 | LL |
|---|---|---|---|---|---|---|---|---|---|---|---|---|
| loi at 950° C. | 2.10 | 2.67 | 1.41 | 1.22 | 0.78 | 3.07 | 5.28 | 0.00 | 0.46 | 0.63 | 0.64 | 42.99 |
| $SiO_2$ | 19.70 | 19.90 | 20.46 | 19.71 | 21.51 | 20.16 | 19.60 | 47.64 | 48.07 | 47.40 | 47.51 | 1.04 |
| $Al_2O_3$ | 5.63 | 5.18 | 4.60 | 4.95 | 3.62 | 4.73 | 4.58 | 14.13 | 14.50 | 13.14 | 13.07 | 0.21 |
| $TiO_2$ | 0.23 | 0.34 | 0.18 | 0.34 | 0.23 | 0.40 | 0.24 | 1.57 | 1.56 | 1.61 | 1.64 | 0.01 |
| MnO | 0.07 | 0.10 | 0.06 | 0.06 | 0.05 | 0.04 | 0.06 | 0.17 | 0.17 | 0.17 | 0.17 | 0.06 |
| $Fe_2O_3$ | 2.99 | 3.06 | 3.84 | 3.20 | 5.30 | 2.77 | 2.18 | 12.06 | 11.76 | 12.06 | 12.16 | 0.16 |
| CaO | 60.63 | 61.36 | 63.55 | 62.41 | 63.46 | 63.64 | 62.00 | 11.58 | 11.89 | 11.21 | 11.26 | 54.58 |
| MgO | 2.31 | 2.46 | 1.58 | 2.45 | 1.50 | 1.13 | 2.28 | 10.15 | 9.28 | 11.31 | 11.43 | 0.91 |
| $K_2O$ | 1.73 | 1.17 | 0.33 | 1.13 | 0.33 | 0.61 | 0.63 | 0.32 | 0.31 | 0.38 | 0.39 | 0.05 |
| $Na_2O$ | 0.11 | 0.46 | 0.33 | 0.43 | 0.24 | 0.21 | 0.25 | 1.92 | 1.94 | 1.84 | 1.84 | 0.01 |
| $SO_3$ | 3.77 | 3.62 | 3.36 | 3.85 | 2.49 | 3.18 | 3.02 | 0.02 | 0.04 | 0.01 | 0.00 | 0.02 |
| $P_2O_5$ | 0.14 | 0.08 | 0.11 | 0.12 | 0.21 | 0.05 | 0.12 | 0.17 | 0.16 | 0.18 | 0.19 | 0.01 |
| Sum | 99.41 | 100.40 | 99.81 | 99.72 | 99.88 | 99.99 | 100.31 | 99.73 | 100.14 | 99.94 | 100.30 | 100.05 |
| X-ray amorph. |  |  |  |  |  | 70.4 | 86.6 | 57.4 | 47.7 |  |  |  |
| $Na_2O$ Eq. | 1.24 | 1.22 | 0.55 | 1.17 | 0.46 | 0.61 | 0.67 | 2.14 | 2.14 | 2.09 | 2.10 | 0.04 |
| Blaine fineness | 4800 | 5710 | 3800 | 5520 | 3790 | 3850 | 4480 | 5680 | 7160 | 7510 | 7130 | 3430 |

The hyaloclastite P1 had an X-ray amorphous (also referred to as glass) content of about 70 wt.-%. The crystalline phases were about 13 wt.-% pyroxene, 9 wt.-% feldspars, and 8 wt.-% olivine. The samples P2 to P4 were taken at different spots in a hyaloclastite mine, known for their differences in purity, i.e. enrichment with basalt and other crystalline rocks. P2 presents a high purity hyaloclastite source, P4 a basalt-rich one and P3 an intermediate type. The crystalline phases were the same as found in P1, namely pyroxene, feldspars, and olivine.

Example 1

The effect of the addition of limestone with a bimodal distribution was determined as follows. The particle size distribution of the three used components was measured by laser diffraction. The results are shown in FIG. 1. The PSD of the pozzolan "P1" is steep with a n value of the slope of 1.03. In contrast, the used cement "Cem1" as well as the limestone "LL" showed a much broader distribution with n values of 0.88 and 0.76, respectively. The first maximum of the derivative curve of the ground limestone was located around 9 μm and the second one around 80 μm.

The compressive strength development was measured in micro mortars. For the micro mortar tests, cubes of 2 cm×2 cm×2 cm were prepared, using a cement to sand weight ratio of 2:3. The sand used had a $D_{10}$, $D_{50}$ and $D_{90}$ of 0.128, 0.215 and 0.355 mm, respectively. A water to cement weight ratio of 0.50 was applied. The mortar cubes were cured for 24 hours in the steel form at 20° C. and >95% RH. The cubes were stored under water after demoulding till the date of testing. The loading speed of the press for the compressive strength measurement was 0.4 kN/s and 6 cubes were tested per sample age. The deviation from the average strength of the 6 tested cubes was for all samples below 1 MPa after 24 hours and below 2 MPa at later ages. The mix design, measured compressive strengths and activity indices are shown in table 3.

TABLE 3

| | Cem1 | P1 | LL | Compressive strength [MPa] after | | | | | | Activity index [%] after | | | | | |
|---|---|---|---|---|---|---|---|---|---|---|---|---|---|---|---|
| | amount [wt.-%] | | | 1 d | 2 d | 7 d | 28 d | 56 d | 91 d | 1 d | 2 d | 7 d | 28 d | 56 d | 91 d |
| Ref1 | 100 | | | 26.0 | 35.6 | 43.2 | 54.7 | 60.1 | 60.8 | — | — | — | — | — | — |
| Ref2 | 75 | 25 | | 16.0 | 23.0 | 31.2 | 45.1 | 56.7 | 62.7 | 61.5 | 64.6 | 72.2 | 82.4 | 94.3 | 103.1 |
| Ref3 | 75 | | 25 | 16.9 | 24.9 | 34.8 | 43.1 | 46.3 | 49.6 | 65.0 | 69.9 | 80.6 | 78.8 | 77.0 | 81.6 |
| 5LL | 75 | 20 | 5 | 17.4 | 25.3 | 35.3 | 49.4 | 58.5 | 65.2 | 66.9 | 71.1 | 81.7 | 90.3 | 97.3 | 107.2 |
| 10LL | 75 | 15 | 10 | 16.8 | 25.0 | 34.1 | 46.3 | 55.1 | 59.9 | 64.6 | 70.2 | 78.9 | 84.6 | 91.7 | 98.5 |
| 15LL | 75 | 10 | 15 | 16.8 | 24.7 | 34.2 | 44.8 | 51.7 | 58.0 | 64.6 | 69.4 | 79.2 | 81.9 | 86.0 | 95.4 |
| 20LL | 75 | 5 | 20 | 15.8 | 23.4 | 31.8 | 40.2 | 45.7 | 52.5 | 60.8 | 65.7 | 73.6 | 73.5 | 76.0 | 86.3 |

It is evident, that the limestone reference Ref3 outperformed the pozzolan cement reference Ref2 up to 28 days of hydration. The higher strength development linked to the pozzolanic reaction was only measureable at later hydration ages for Ref2 compared to Ref3. The replacement of 5 wt.-% of P1 by LL results in a significant increase of the compressive strength at all measured hydration ages compared to Ref2. Even a slightly better strength development up to 7 d, followed by a significant improvement at all later hydration ages was observed compared to Ref3. The replacement of 10 wt.-% improved the strength development at early ages up to 7 days of hydration compared to Ref2. The effect levelled out at later hydration ages. All pozzolan-limestone mixes outperform Ref3 after 91 days of hydration, even the mix with only 5% of pozzolan. All those results demonstrate the synergetic reaction between the hyaloclastite pozzolan and limestone in a Portland composite cement.

Example 2

Two cements, namely "Cem2" and "Cem3", with different $Na_2O$ Eq. and fineness but similar ultimate strength at 28 and 91 days of hydration were used to investigate the impact of the reactivity of three hyaloclastite samples with different amorphous contents. "Cem2" contained about 4 wt.-% of limestone, whereas it was only about 2 wt.-% in "Cem3". In both cases, limestone was added during the cement grinding. The particle size distribution was not measured, but is assumed to have been monomodal. The compressive strength development was measured in standard mortar cubes in accordance with EN 196-1. The composition of the mixes and the measured strength in MPa and activity indices in % are listed in table 4.

TABLE 4

| | Compressive strength [MPa] after | | Activity index [%] after | |
|---|---|---|---|---|
| mix composition | 28 d | 91 d | 28 d | 91 d |
| 100% Cem2 | 56.1 | 60.7 | — | — |
| 100% Cem3 | 58.9 | 63.8 | — | — |
| 75% Cem2 + 25% P2 | 57.3 | 63.1 | 102 | 104 |
| 75% Cem3 + 25% P2 | 50.9 | 65.1 | 86 | 102 |
| 75% Cem2 + 25% P3 | 52.2 | 58.7 | 93 | 97 |
| 75% Cem3 + 25% P3 | 46.0 | 62.2 | 78 | 97 |
| 75% Cem2 + 25% P4 | 50.0 | 58.9 | 89 | 97 |
| 75% Cem3 + 25% P4 | 43.5 | 59.3 | 74 | 93 |

It can be seen that the fine, alkali-rich cement Cem2 that also contained about 4 wt.-% of limestone demonstrated the highest activation potential for all three tested pozzolans after 28 d compared to Cem3. The Cem3-based composite cements did only catch up after 91 days of hydration but still fell slightly short of the Cem2-based composite cements in case of P2 and P4. Those results demonstrate that it is possible to enhance the pozzolanic reaction and linked pozzolan dosage in composite cements by choice of the used cement type. Although this example used a carbonate filler not according to the invention, the found effect of alkali content of the hydraulic cement is expected to be the same or likely even stronger for carbonate with bimodal PSD.

Example 3

Two cements "Cem4" and "Cem5" with different $Na_2O$ Eq. and fineness but similar ultimate strength at 28 and 91 days of hydration were used to investigate the impact of $Na_2O$ Eq. on the reactivity of P1 but without limestone being present. Those cements are different batches of Cem2 and Cem3, produced in the same cement plant but without adding any limestone during grinding. The compressive strength development was measured in standard mortar cubes in accordance with EN 196-1. The composition of the mixes and the measured strength in MPa and activity indices in % are listed in table 5.

TABLE 5

| mix composition | Compressive strength [MPa] after | | | | Activity index [%] after | | | |
| --- | --- | --- | --- | --- | --- | --- | --- | --- |
| | 1 d | 7 d | 28 d | 91 d | 1 d | 7 d | 28 d | 91 d |
| 100% Cem2.1 | 35.4 | 50.4 | 57.1 | 61.2 | | | | |
| 100% Cem3.1 | 20.4 | 45.8 | 62.4 | 64.7 | | | | |
| 75% Cem2.1 + 25% P1 | 22.8 | 41.3 | 49.4 | 60.8 | 64 | 82 | 87 | 99 |
| 75% Cem3.1 + 25% P1 | 13.0 | 32.7 | 49.7 | 62.4 | 64 | 71 | 80 | 96 |

It can be seen that the fine, alkali-rich cement Cem4 demonstrated, as expected from example 2, a stronger activation potential for tested pozzolans up to 28 days of hydration compared to Cem5, also in the absence of limestone. Again, the composite cements tested are not according to the invention since no carbonate filler was used, but the effect will be the same or likely even stronger with carbonate filler used in accordance to the invention.

Example 4

The effect of blending co-ground limestone cement with separately ground pozzolan was examined. Two industrial cements were used for this trial, namely a neat CEM I 52.5 N "Cem6" with about 4 wt.-% of limestone and a CEM II/A-LL 42.5 N "Cem7" with about 11 wt.-% of limestone. Cem6 and Cem7 were produced by co-grinding with coarse limestone. The cement was further analysed by SEM-EDS analyses of polished sections to assess the particle size distribution of the individual components (also referred to as mineral liberation analysis "MLA"), namely cement and limestone, and if a monomodal or the targeted bimodal distribution of LL was achieved. The cement clinker presented a broad, monomodal distribution with particles being present in all detectable size fractions. The $D_{50}$ and $D_{90}$ from the MLA were about 25 μm and 50 μm, respectively. The maximum of the derivative curve was located around 35 μm. The limestone in Cem7 demonstrated a broad, bimodal distribution. The $D_{50}$ and $D_{90}$ from the MLA were about 7 μm and 45 μm, respectively. The first maximum of the derivative curve was located around 7 μm and the second one around 43 μm. The limestone in Cem6 had a broad, monomodal distribution with particles being present in the size fractions below 30 μm. The $D_{50}$ and $D_{90}$ from the MLA were about 7 μm and 22 μm, respectively. The single maximum of the derivative curve was located around 10 μm.

The compressive strength development was measured in standard mortar cubes in accordance with EN 196-1 as done for example 2. The composition of the mixes in wt.-%, the measured strength in MPa, and activity indices in % are listed in table 6.

TABLE 6

| mix composition | Compressive strength [MPa] after | | | | | | Activity index [%] after | | | | | |
| --- | --- | --- | --- | --- | --- | --- | --- | --- | --- | --- | --- | --- |
| | 1 d | 2 d | 7 d | 28 d | 56 d | 91 d | 1 d | 2 d | 7 d | 28 d | 56 d | 91 d |
| 100% Cem6 | n.m. | n.m. | 48.1 | 60.5 | n.m. | n.m. | — | — | — | — | — | — |
| 75% Cem6 + 25% P1 | 14.3 | 22.3 | 33.0 | 47.2 | 56.6 | 62.0 | n.m. | n.m. | 68.6 | 78.0 | n.m. | n.m. |
| 100% Cem7 | 22.4 | 34.5 | 48.7 | 56.9 | | | — | — | — | — | | |
| 75% Cem7 + 25% P1 | 16.0 | 26.6 | 38.7 | 49.2 | | | 71.4 | 77.1 | 79.5 | 87.5 | | |

The strength development of the Cem7-P outperformed Cem6-P at all tested hydration ages, despite the much lower cement content, i.e. the higher limestone replacement. This again demonstrates the synergies between the bimodal limestone and the hyaloclastite pozzolan P1 in the presence of Portland cement. It further reveals the importance of the bimodal distribution of the limestone filler. Additionally, it also shows that the cement performance can be optimized by separate grinding of the pozzolan and blending with the other cement components as well as by optimizing the cement fineness. With those measures a pozzolan-limestone composite cement can be produced with high strength development and good fresh properties such water demand and workability.

Example 5

The effect of sieving on X-ray amorphous content was examined. The pozzolan P1, a sieved fraction 0-10 mm from the material as received in big bags with about 85 kg pozzolan each, was dried at 110° C. and used for the trials. The material was sieved to different size fractions and the obtained samples were analysed by X-ray diffraction coupled with Rietveld analysis to determine the X-ray amorphous content. The results for the pozzolan P1 and for the fractions made from it by sieving (sieve sizes in mm) are assembled in table 6. Further, the pozzolan from several big bags was ground together using a vertical roller press mill and the X-ray amorphous content measured. This sample is designated bulk and the result is also listed in table 7.

TABLE 7

| | sample | | | | | | | | |
|---|---|---|---|---|---|---|---|---|---|
| | bulk | P1 | 0-1 mm | 0-2 mm | 0-4 mm | 1-4 mm | 4-8 mm | 2-10 mm | 4-10 mm |
| Crystalline content [wt.-%] | 79 | 70 | 87 | 87 | 83 | 57 | 48 | 51 | 53 |
| X-ray amorphous content [wt.-%] | 21 | 30 | 13 | 13 | 17 | 43 | 52 | 49 | 47 |

The results demonstrate that it is possible to separate the crystalline rock from the glassy hyaloclastite pozzolan by sieving and with that, to increase the X-ray amorphous content significantly. Consequently, the grindability as well as the reactivity in a composite cement will improve. The difference between samples P1 and bulk is likely associated with the improved material homogenisation of the several tons of material mixing during the grinding. Thus, it is expected that industrial scale grinding will provide even better results for the composite cement than found in the laboratory experiments, since the hyaloclastite pozzolan will have higher X-ray amorphous content.

The following embodiments are particularly preferred embodiments of the present invention.

Embodiment 1: Composite cement comprising
a hydraulic cement or a caustic activator,
a hyaloclastite as pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$), and having 0-5 wt.-% loss on ignition at 950° C. and ≥50 wt.-% X-ray amorphous phase, and
a carbonate filler with an at least bimodal particle size distribution adapted to provide a slope n in a Rosin-Rammler-Sperling-Bennett distribution curve of ≤1.15 in a particle size distribution of the composite cement.

Embodiment 2: Composite cement as defined in embodiment 1, wherein the particle size distribution of the composite cement has a slope n from 0.80 to 1.15, preferably from 0.90 to 1.05, most preferred from 0.95 to 1.00 and/or the composite cement has a fineness according to Blaine from 3500 to 10000 cm$^2$/g, preferably from 4500 to 8000 cm$^2$/g, most preferred from 5000 to 6000 cm$^2$/g.

Embodiment 3 Composite cement as defined in embodiment 1 or 2, wherein the pozzolan contains 0.5 to 4 wt.-% other elements and/or the pozzolan contains 46-54 wt.-% $SiO_2$, 12-17 wt. % $Al_2O_3$, 8-14 wt.-% $Fe_2O_3$, 10-13 wt.-% CaO, 10-13 wt.-% MgO, 1.5-3 wt. % ($K_2O+Na_2O$) and/or the amount of X-ray amorphous phase in the pozzolan is ≥60 wt.-%, preferably ≥70 wt.-%, more preferred ≥80 wt.-%, most preferred ≥85 wt.-%.

Embodiment 4: Composite cement as defined in at least one of embodiments 1 to 3, wherein the pozzolan has a monomodal particle size distribution, preferably with a slope n in a Rosin-Rammler-Sperling-Bennett distribution curve from 0.9 to 1.4, more preferred from 1.0 to 1.2 and/or the pozzolan has a fineness according to Blaine from 4500 to 8000 cm$^2$/g, preferably from 5000 to 6000 cm$^2$/g.

Embodiment 5: Composite cement as defined in at least one of embodiments 1 to 4, wherein the hydraulic cement is selected from Portland cement, calcium aluminate cement, calcium sulfoaluminate cement, belite binder obtained by hydrothermal treatment and subsequent tempering and/or reactive grinding, and mixtures thereof, and/or the caustic activator is selected from free lime, portlandite, Portland cement, Portland cement clinker, alkali hydroxides, alkali carbonates, alkali sulfates and mixtures thereof.

Embodiment 6: Composite cement as defined in at least one of embodiments 1 to 5, wherein the hydraulic cement is a Portland cement with an $Na_2O$ Eq. from 0.3 to 2.5 wt.-%, preferably from 1.0 to 2.0 wt.-%, most preferred from 1.2 to 1.5 wt.-%, and/or with an amount of $C_3S$ from 45 to 74 wt.-%, preferably from 55 to 65 wt.-%, and/or with an amount of $C_3A$ from 1 to 18 wt.-%, preferably from 2 to 12 wt.-%, most preferred from 3 to 7 wt.-%, all with respect to the hydraulic cement clinker.

Embodiment 7: Composite cement as defined in at least one of embodiments 1 to 6, wherein the hydraulic cement or caustic activator has a fineness according to Blaine from 2000 to 10000 cm$^2$/g, preferably from 3000 to 8000 cm$^2$/g, most preferred of at least 4000 cm$^2$/g.

Embodiment 8: Composite cement as defined in at least one of embodiments 1 to 7, wherein the carbonate filler has a bimodal particle size distribution with ≥20 wt.-%, preferably ≥30 wt.-%, most preferred ≥40 wt.-%, particles having a $D_{10}$≥30 µm or ≥35 µm or ≥40 µm, and ≥20 wt.-% particles, preferably ≥30 wt.-%, having a $D_{90}$≤30 µm or ≤20 µm or ≤10 µm, and/or the carbonate filler has a slope n below 1.0, preferably below 0.85, most preferred below 0.75.

Embodiment 9: Composite cement as defined in at least one of embodiments 1 to 8, wherein the carbonate filler is selected from limestone; dolomite; magnesite; precipitated nanosized carbonates; poorly crystalline or X-ray amorphous carbonates; complex partly hydrated carbonates like monohydrocalcite, hydromagnesite, nesquehonite, dypingite; and mixtures of two or more thereof, most preferably is limestone.

Embodiment 10: Composite cement as defined in at least one of embodiments 1 to 9, wherein the amount of pozzolan and carbonate filler together ranges from 15 to 50 wt.-%, preferably from 20 to 35 wt.-%, most preferred from 22 to 30 wt.-%.

Embodiment 11: Composite cement as defined in at least one of embodiments 1 to 10, wherein the weight ratio of pozzolan to carbonate filler ranges from 20:1 to 1:1, preferably from 15:1 to 2:1, most preferred from 9:1 to 4:1.

Embodiment 12: Method for manufacturing a composite cement as defined in at least one of embodiments 1 to 11 comprising the steps:
providing a hydraulic cement or a caustic activator,
providing a hyaloclastite as pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$), and having 0-5 wt.-% loss on ignition at 950° C. and ≥50 wt.-% X-ray amorphous phase,
providing a carbonate filler with an at least bimodal particle size distribution, ground partly or fully separately from the hydraulic cement and the pozzolan, adapted to provide a slope n in a Rosin-Rammler-Sperling-Bennett distribution curve of ≤1.15 in a particle size distribution of the composite cement, and
blending the hydraulic cement or caustic activator, the pozzolan and the carbonate filler to provide the composite cement, and if needed adjusting the sulfate content of the composite cement adding a sulfate source, preferably a calcium sulfate.

Embodiment 13: Method as defined in embodiment 12, wherein the pozzolan is ground, preferably separately from the hydraulic cement and the carbonate filler, to a monomodal particle size distribution, preferably with a slope n in a Rosin-Rammler-Sperling-Bennett distribution curve from 0.9 to 1.4, more preferred from 1.0 to 1.2, and/or to a fineness according to Blaine from 4500 to 8000 $cm^2/g$, preferably from 5000 to 6000 $cm^2/g$.

Embodiment 14: Method as defined in embodiment 12 or 13, wherein the carbonate filler is ground separately from the hydraulic cement and the pozzolan, or ≤20 wt.-%, preferably ≤10 wt.-%, most preferred ≤5 wt.-%, of the carbonate filler are ground together with the hydraulic cement, the pozzolan or a cement-pozzolan mix and the remainder is ground separately, wherein the carbonate filler is ground to a bimodal particle size distribution with ≥20 wt.-% particles, preferably ≥30 wt.-%, more preferred ≥40 wt.-%, having a $D_{10}$≥30 μm or ≥35 μm or ≥40 μm, and ≥20 wt.-% particles, preferably ≥30 wt.-%, having a $D_{90}$≤30 μm or ≤20 μm or ≤10 μm.

Embodiment 15: Method as defined in at least one of embodiments 12 to 14, wherein a grinding aid is added during grinding of at least one of the hydraulic cement, the pozzolan and the carbonate filler, wherein the grinding aid is preferably selected from alkanolamines; sugars and sugar derivatives; glycols like mono-, di-, triethylene glycols; carboxylic acids and their salts like oleic acid, ethylenediaminetetraacetic acid, sodium gluconate; carbonic anhydrase; diols; glycerol; sulphonic acids; (ligno)sulphonates; and mixtures thereof; more preferred from alkanolamines; most preferred from monoethanolamine, diethanolamine, diglycolamine, diisopropanolamine, triethanolamine, triisopropanolamine, and mixtures thereof.

Embodiment 16: Method as defined in at least one of embodiments 12 to 15, wherein from 15 to 50 wt.-%, preferably from 20 to 35 wt.-%, most preferred from 22 to 30 wt.-%, pozzolan and carbonate filler together are used, and/or a weight ratio of pozzolan to carbonate filler from 20:1 to 1:1, preferably from 15:1 to 2:1, most preferred from 9:1 to 4:1.

Embodiment 17: Method as defined in at least one of embodiments 12 to 16, wherein the particle sizes and amounts of hydraulic cement or caustic activator, pozzolan and carbonate filler are selected such that the composite cement has a fineness according to Blaine from 3500 to 10000 $cm^2/g$, preferably from 4500 to 8000 $cm^2/g$, most preferred from 5000 to 6000 $cm^2/g$, and/or the slope n in a Rosin-Rammler-Sperling-Bennett distribution curve of the composite cement ranges from 0.80 to 1.15, preferably from 0.90 to 1.05, most preferred from 0.95 to 1.00.

Embodiment 18: Method as defined in at least one of embodiments 12 to 17, wherein the hydraulic cement has an $Na_2O$ Eq. from 0.3 to 2.5 wt.-%, preferably from 1.0 to 2.0 wt.-%, most preferred from 1.2 to 1.5 wt.-%, adjusted by addition of alkalis like carbonates, sulfates, chlorides and process dust from clinker production when the $Na_2O$ Eq. of the used hydraulic cement is below the desired value, and/or the hydraulic cement has an amount of $C_3A$ from 1 to 18 wt.-%, preferably from 2 to 12 wt.-%, most preferred from 3 to 7 wt.-%, all with respect to the hydraulic cement clinker.

Embodiment 19: Method as defined in at least one of embodiments 12 to 18, wherein further components are added to the composite cement, selected from admixtures, preferably plasticizers, superplasticizers, water reducers, stabilizers, air entraining agents, setting accelerators, hardening accelerators, retarders, sealants, chromate reducing agents, and mixtures of two or more thereof; and further SCMs, preferably ground granulated blast furnace slag, fly ash, calcined clay or shales, trass, brick-dust, artificial glasses, waste glass, silica fume, burned organic matter residues rich in silica such as rice husk ash, carbonated recycled concrete fines, natural pozzolans other than hyaloclastite, and mixtures of two or more thereof.

Embodiment 20: Use of a composition comprising
a hyaloclastite as pozzolan containing 45-62 wt.-% $SiO_2$, 10-20 wt.-% $Al_2O_3$, 6-15 wt.-% $Fe_2O_3$, 7-15 wt.-% CaO, 7-15 wt.-% MgO, 1.5-4 wt.-% ($Na_2O+K_2O$), and having 0-5 wt.-% loss on ignition at 950° C. and ≥50 wt.-% X-ray amorphous phase, and
a carbonate filler with an at least bimodal particle size distribution as mineral addition for composite cements comprising a hydraulic cement or a caustic activator.

What is claimed is:

1. A composite cement comprising
a hydraulic cement or a caustic activator,
a hyaloclastite as pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$), and having 0-5 wt.-% loss on ignition at 950° C. and ≥50 wt.-% X-ray amorphous phase, and
a carbonate filler with an at least bimodal particle size distribution adapted to provide a slope n in a Rosin-Rammler-Sperling-Bennett distribution curve of ≤1.15 in a particle size distribution of the composite cement, wherein an amount of pozzolan and carbonate filler together ranges from 15 to 50 wt.-%.

2. The composite cement according to claim 1, wherein the particle size distribution of the composite cement has a slope n from 0.80 to 1.15, and/or the composite cement has a fineness according to Blaine from 3500 to 10000 $cm^2/g$.

3. The composite cement according to claim 2, wherein the slope n of the particle size distribution of the composite cement ranges from 0.90 to 1.05 and/or the fineness ranges from 4500 to 8000 $cm^2/g$.

4. The composite cement according to claim 3, wherein the slope n of the particle size distribution of the composite cement ranges from 0.95 to 1.00 and/or the fineness ranges from 5000 to 6000 cm²/g.

5. The composite cement according to claim 4, wherein the amount of the X-ray amorphous phase in the pozzolan is ≥70 wt.-%.

6. The composite cement according to claim 5, wherein the slope n of the particle size distribution of the pozzolan ranges from 1.0 to 1.2 and/or the pozzolan has a fineness from 5000 to 6000 cm²/g.

7. The composite cement according to claim 6, the particle size distribution of the carbonate filler comprises ≥40 wt.-% particles with a $D_{10}$≥40 μm and/or ≥30 wt.-% particles with a $D_{90}$≤10 μm and/or the slope n is below 0.75.

8. The composite cement according to claim 7, wherein the amount of pozzolan and carbonate filler together ranges from 22 to 30 wt.-% and/or the weight ratio of pozzolan to carbonate filler ranges from 9:1 to 4:1.

9. The composite cement according to claim 6, wherein the amount of pozzolan and carbonate filler together ranges from 22 to 30 wt.-% and/or the weight ratio of pozzolan to carbonate filler ranges from 9:1 to 4:1.

10. The composite cement according to claim 5, wherein the particle size distribution of the carbonate filler comprises ≥40 wt.-% particles with a $D_{10}$≥40 μm and/or ≥30 wt.-% particles with a $D_{90}$≤10 μm and/or the slope n is below 0.75.

11. The composite cement according to claim 10, wherein the amount of pozzolan and carbonate filler together ranges from 22 to 30 wt.-% and/or the weight ratio of pozzolan to carbonate filler ranges from 9:1 to 4:1.

12. The composite cement according to claim 5, wherein the amount of pozzolan and carbonate filler together ranges from 22 to 30 wt.-% and/or the weight ratio of pozzolan to carbonate filler ranges from 9:1 to 4:1.

13. The composite cement according to claim 1, wherein the pozzolan contains 0.5 to 4 wt.-% other elements and/or the pozzolan contains 46-54 wt.-% $SiO_2$, 12-17 wt. % $Al_2O_3$, 8-14 wt.-% $Fe_2O_3$, 10-13 wt.-% CaO, 10-13 wt.-% MgO, 1.5-3 wt. % ($K_2O+Na_2O$) and/or the amount of the X-ray amorphous phase in the pozzolan is ≥60 wt.-%.

14. The composite cement according to claim 13, wherein the amount of the X-ray amorphous phase in the pozzolan is ≥70 wt.-%.

15. The composite cement according to claim 14, wherein the amount of the X-ray amorphous phase in the pozzolan is ≥80 wt.-%.

16. The composite cement according to claim 1, wherein the pozzolan has a monomodal particle size distribution with a slope n in a Rosin-Rammler-Sperling-Bennett distribution curve from 0.9 to 1.4, and/or the pozzolan has a fineness according to Blaine from 4500 to 8000 cm²/g.

17. The composite cement according to claim 16, wherein the slope n of the particle size distribution of the pozzolan ranges from 1.0 to 1.2 and/or the pozzolan has a fineness from 5000 to 6000 cm²/g.

18. The composite cement according to claim 1, wherein the hydraulic cement is selected from the group consisting of Portland cement, calcium aluminate cement, calcium sulfoaluminate cement, belite binder obtained by hydrothermal treatment and subsequent tempering and/or reactive grinding, and mixtures thereof, and/or the caustic activator is selected from the group consisting of free lime, portlandite, Portland cement, Portland cement clinker, alkali hydroxides, alkali carbonates, alkali sulfates and mixtures thereof.

19. The composite cement according to claim 1, wherein the hydraulic cement is a Portland cement with an $Na_2O$ Eq. from 0.3 to 2.5 wt.-%, and/or with an amount of $C_3S$ from 45 to 74 wt.-%, and/or with an amount of $C_3A$ from 1 to 18 wt.-%, all with respect to the hydraulic cement clinker.

20. The composite cement according to claim 19, wherein the $Na_2O$ Eq. ranges from 1.0 to 2.0 wt.-% and/or the amount of $C_3S$ ranges from 55 to 65 wt.-% and/or the amount of $C_3A$ ranges from 2 to 12 wt.-%.

21. The composite cement according to claim 20, wherein the $Na_2O$ Eq. ranges from 1.2 to 1.5 wt.-% and/or the amount of $C_3A$ ranges from 3 to 7 wt.-%.

22. The composite cement according to claim 1, wherein the hydraulic cement or caustic activator has a fineness according to Blaine from 2000 to 10000 cm²/g.

23. The composite cement according to claim 1, wherein the carbonate filler has a bimodal particle size distribution with ≥20 wt.-% particles having a $D_{10}$≥30 μm, and ≥20 wt.-% particles having a $D_{90}$≤30 μm, and/or the carbonate filler has a slope n below 1.0.

24. The composite cement according to claim 23, wherein the particle size distribution of the carbonate filler comprises particles ≥30 wt.-% particles with a $D_{10}$≥35 μm and/or ≥30 wt.-% particles with a $D_{90}$≤20 μm and/or the slope n is below 0.85.

25. The composite cement according to claim 24, wherein the particle size distribution of the carbonate filler comprises ≥40 wt.-% particles with a $D_{10}$≥40 μm and/or ≥30 wt.-% particles with a $D_{90}$≤10 μm and/or the slope n is below 0.75.

26. The composite cement according to claim 1, wherein the carbonate filler is selected from the group consisting of limestone; dolomite; magnesite; precipitated nanosized carbonates; poorly crystalline or X-ray amorphous carbonates; complex partly hydrated carbonates; and mixtures of two or more thereof.

27. The composite cement according to claim 1, wherein a weight ratio of pozzolan to carbonate filler ranges from 20:1 to 1:1.

28. The composite cement according to claim 27, wherein the weight ratio of pozzolan to carbonate filler ranges from 15:1 to 2:1.

29. The composite cement according to claim 28, wherein the weight ratio of pozzolan to carbonate filler ranges from 9:1 to 4:1.

30. The composite cement according to claim 1, wherein the amount of pozzolan and carbonate filler together ranges from 20 to 35 wt.-%.

31. The composite cement according to claim 30, wherein the amount of pozzolan and carbonate filler together ranges from 22 to 30 wt.-%.

32. A method for manufacturing a composite cement according to claim 1 comprising the steps:
providing a hydraulic cement or a caustic activator,
providing a hyaloclastite as pozzolan containing 45-62 wt.-% $SiO_2$, 10-20 wt. % $Al_2O_3$, 6-15 wt.-% $Fe_2O_3$, 7-15 wt.-% CaO, 7-15 wt.-% MgO, 1.5-4 wt. % ($K_2O+Na_2O$), and having 0-5 wt.-% loss on ignition at 950° C. and 50 wt.-% X-ray amorphous phase,
providing a carbonate filler with an at least bimodal particle size distribution, ground partly or fully separately from the hydraulic cement and the pozzolan, adapted to provide a slope n in a Rosin-Rammler-Sperling-Bennett distribution curve of ≤1.15 in a particle size distribution of the composite cement, and
blending the hydraulic cement or caustic activator, the pozzolan and the carbonate filler to provide the composite cement, wherein from 15 to 50 wt.-% pozzolan and carbonate filler together are used.

33. The method according to claim 32, wherein the pozzolan is ground separately from the hydraulic cement and the carbonate filler to a mono-modal particle size distribution.

34. The method according to claim 33, wherein the pozzolan is ground to a monomodal particle size distribution with a slope n in a Rosin-Rammler-Sperling-Bennett distribution curve from 0.9 to 1.4 and/or to a fineness according to Blaine from 4500 to 8000 cm$^2$/g.

35. The method according to claim 32, wherein the carbonate filler is ground separately from the hydraulic cement and the pozzolan, or ≤20 wt.-% of the carbonate filler are ground together with the hydraulic cement, the pozzolan or a cement-pozzolan mix and the remainder is ground separately, wherein the carbonate filler is ground to a bimodal particle size distribution with ≥20 wt.-% particles having a $D_{10} \geq 30$ μm, and ≥20 wt.-% particles having a $D_{90} \leq 30$ μm.

36. The method according to claim 35, wherein the carbonate filler ≤10 wt.-% of the carbonate filler is ground together with the hydraulic cement, the pozzolan or the cement-pozzolan mix and the remainder is ground separately, wherein the carbonate filler is ground to a bimodal particle size distribution with ≥30 wt.-% particles having a $D_{10} \geq 35$ μm, and ≥30 wt.-% particles having a $D_{90} \leq 20$ μm.

37. The method according to claim 36, wherein the carbonate filler ≤5 wt.-% of the carbonate filler is ground together with the hydraulic cement, the pozzolan or the cement-pozzolan mix and the remainder is ground separately, wherein the carbonate filler is ground to a bimodal particle size distribution with ≥40 wt.-% particles having a $D_{10} \geq 40$ μm, and ≥30 wt.-% particles having a $D_{90} \leq 10$ μm.

38. The method according to claim 32, wherein providing at least one of the hydraulic cement, the pozzolan and the carbonate filler includes grinding the hydraulic cement, the pozzolan and/or the carbonate filler, wherein a grinding aid is added during grinding of at least one of the hydraulic cement, the pozzolan and the carbonate filler, wherein the grinding aid is selected from the group consisting of alkanolamines; sugars and sugar derivatives; glycols; carboxylic acids and their salts; carbonic anhydrase; diols; glycerol; sulphonic acids; (ligno)sulphonates; and mixtures thereof.

39. The method according to claim 32, wherein a weight ratio of pozzolan to carbonate filler ranges from 20:1 to 1:1.

40. The method according to claim 39, wherein from 25 to 35 wt.-% pozzolan and carbonate filler together are used, and/or a weight ratio of pozzolan to carbonate filler from 15:1 to 2:1.

41. The method according to claim 40, wherein from 31-9 wt-% pozzolan and carbonate filler together are used, and/or a weight ratio of pozzolan to carbonate filler from 9:1 to 4:1.

42. The method according to claim 32, wherein the particle sizes and amounts of hydraulic cement or caustic activator, pozzolan and carbonate filler are selected such that the composite cement has a fineness according to Blaine from 3500 to 10000 cm$^2$/g, and/or the slope n in a Rosin-Rammler-Sperling-Bennett distribution curve of the composite cement ranges from 0.80 to 1.15.

43. The method according to claim 32, wherein the hydraulic cement has an Na$_2$O Eq. from 0.3 to 2.5 wt.-% adjusted by addition of alkalis selected from the group consisting of alkali carbonates, alkali sulfates, alkali chlorides and process dust from clinker production when the Na$_2$O Eq. of the used hydraulic cement is below the desired value, and/or the hydraulic cement has an amount of C$_3$A from 1 to 18 wt.-% with respect to the hydraulic cement clinker.

44. The method according to claim 32, wherein further components are added to the composite cement, being admixtures selected from the group consisting of plasticizers, superplasticizers, water reducers, stabilizers, air entraining agents, setting accelerators, hardening accelerators, retarders, sealants, chromate reducing agents, and mixtures of two or more thereof; and/or being further SCMs selected from the group consisting of ground granulated blast furnace slag, fly ash, calcined clay or shales, trass, brick-dust, artificial glasses, waste glass, silica fume, burned organic matter residues rich in silica, carbonated recycled concrete fines, natural pozzolans other than hyaloclastite, and mixtures of two or more thereof.

* * * * *